United States Patent [19]

Mazzotta

[11] 4,353,536

[45] Oct. 12, 1982

[54] MITER CLAMP

[76] Inventor: Peter Mazzotta, 424 Union Ave., Kittanning, Pa. 16201

[21] Appl. No.: 231,491

[22] Filed: Feb. 4, 1981

[51] Int. Cl.³ .............. B23Q 3/02

[52] U.S. Cl. .............. 269/94; 269/238; 269/100; 269/208; 83/477.2; 83/409

[58] Field of Search .............. 269/91, 93–94, 269/318, 238, 228, 100, 6, 55, 67, 208; 83/477.2, 435.1, 437, 418, 419, 409; 254/120, 123, 129, 130, 10 R, 10 B, 10 C

[56] References Cited

U.S. PATENT DOCUMENTS

| | | | |
|---|---|---|---|
| 1,560,748 | 11/1925 | Wilderson . | |
| 1,894,010 | 1/1933 | Tautz . | |
| 1,997,428 | 4/1935 | Olson | 269/94 |
| 2,001,306 | 5/1935 | Gressner . | |
| 2,436,941 | 3/1948 | Sendoykas | 269/91 |
| 2,752,960 | 7/1956 | Poeltl . | |
| 2,759,503 | 8/1956 | Goldschmidt . | |
| 2,782,819 | 2/1957 | Levy, Jr. . | |
| 2,785,709 | 3/1957 | Shepp . | |
| 2,888,052 | 5/1959 | Reason | 269/91 |
| 3,051,204 | 8/1962 | Gaskell . | |
| 3,970,296 | 7/1976 | Rameson | 269/93 |
| 3,993,298 | 11/1976 | Marshall | 269/100 |
| 4,026,173 | 5/1977 | Livick . | |
| 4,084,803 | 4/1978 | Beekenkamp | 269/91 |
| 4,155,283 | 5/1979 | Mericle . | |
| 4,164,882 | 8/1979 | Mericle . | |

FOREIGN PATENT DOCUMENTS

| | | | |
|---|---|---|---|
| 582077 | 11/1946 | United Kingdom | 269/328 |
| 778765 | 7/1957 | United Kingdom | 269/228 |

*Primary Examiner*—Robert C. Watson
*Attorney, Agent, or Firm*—Webb, Burden, Robinson & Webb

[57] ABSTRACT

Clamp for pressing a workpiece to a miter square and advancing the workpiece through a saw or the like. The clamp comprises two spanning arms and two other arms pivotally joined in a four-sided structure such that, if the arms comprise two pairs of equal length arms, the clamp comprises a parallelogram. One of the short arms is upstanding and pivotally mounted to the miter square. An opposite arm has secured thereto a foot for engaging the workpiece and a handle for pressing the foot against the workpiece through lever action while simultaneously pushing the workpiece toward the saw.

5 Claims, 3 Drawing Figures

MITER CLAMP

BACKGROUND

A miter square is a device that has a slide that slides in a guideway in the surface of the table of a radial table saw which guideway is parallel to the sawing direction. The miter square rides on the table and is adjustably fixed at some angle to the slide which establishes an adjustable angle between a workpiece held against the miter square and the saw. Typically, a workman holds the workpiece, for example a board, tightly against the miter square with his fingers and presses forward with his arms to move the miter square and board through the saw. When the miter square is substantially offset from the saw or at an angle other than a right angle is being cut, the workpiece tends to pry away from the miter square. It is an advantage of this invention to provide a clamp to tightly hold the workpiece against the miter square without risking injury to the operator's hands or fingers and to thus enable a better miter cut.

It is a further advantage of this invention to provide an easily adjustable clamp that does not require turning of knobs to secure the clamp to the miter square or to press the workpiece against the miter square or table.

Prior patentees have proposed work clamping attachments for the same purpose. See, for example, U.S. Pat. Nos. 2,752,960; 2,782,819; and 2,785,709. These patents disclose various clamps which are adapted to be attached to the miter square of a saw table for clamping the workpiece tightly for sawing. Specifically, U.S. Pat. No. 2,752,960 discloses a clamp having one end attached to the miter square and the opposite end adjustably secured to the opposite end of the workpiece. Adjustability is provided by a threaded rod 18. It is also known that adjustability can be provided by a sliding bar bracket arrangement as shown in U.S. Pat. No. 2,782,819. Further, a bar having a series of openings therein is shown in U.S. Pat. No. 2,001,306.

A number of prior art patents disclose devices for engaging the top of the workpiece. See, for example, U.S. Pat. Nos. 1,560,748; 1,894,010; 2,759,503; 3,051,204; and 4,026,173. U.S. Pat. Nos. 2,782,819; 2,785,709; 4,155,283; and 4,164,882 show engagement of a device at the front edge of the workpiece but do not include a front handle or parallel elongate adjustable member as will be described herein.

SUMMARY OF THE INVENTION

Briefly according to this invention, there is provided an adjustable clamp for attachment to a miter square of a table saw which clamp engages the leading edge of the workpiece. The clamp comprises a base having a downward extending plug or pin which is journaled in a bushing or bore in the miter square for rotatably securing the base to the miter square. The base preferably has two upstanding flanges parallel to each other and perpendicular to the deck thereof. Bores in the flanges are aligned to permit a pin to pass therethrough parallel to the deck.

A first spanning arm having a plurality of spaced bores along the length thereof and one bore very near the base is rotatably secured to the base by a pin, shoulder bolt, rivet or the like through the said bores in the upstanding flanges. A short riser arm having bores near each end thereof is rotatably held to the base by the same pin that holds the first spanning arm. The second spanning arm, substantially identical to the first, is rotatably secured to the end of the short riser arm remote from the base by a pin, shoulder bolt, rivet or the like passing through bores in the end of each. An elongate upstanding gripper arm having a handle at one end and a pivotally mounted shoe for engaging the workpiece at the other end has a plurality of bores therein at least two of which are spaced apart substantially the same distance as the bores of the short riser arm. The gripper arm is held to the ends of the first and second spanning arms by easily removable pins, shoulder bolts, or the like passing therethrough. Thus, the clamp comprising the four pivotally connected arms is free to rotate about the pin holding it to the base. It may be rotated away from the saw table while a workpiece is placed against the miter square and then rotated back down to engage the leading edge of the workpiece. When the handle is pressed in a direction along the spanning arms away from the base, the foot presses the workpiece against the miter and moves the entire workpiece and miter square toward the work station.

Preferably, the spanning arms comprise two flat arms between which the short upstanding arm and gripper arm are sandwiched. The ends of the spanning arm near the base are curved and the pin bore is sufficiently near the end such that the rotation of the arm is unrestricted by the base or the workpiece. Preferably, the pins are easily removable and thereby enable the clamp to be reconfigured with the distance between the short riser arm and the gripper arm being adjustable. According to a preferred embodiment, the shoe comprises an angle, which may be a portion of angle iron, with a flaring web laying against the arm and another flaring web opening away from the handle and toward the base such that the angle iron will envelop the upper outer edges of the workpiece. The flaring webs have a curved cross section to prevent marking of the workpiece by the shoe. Preferably the handle is provided with a handle grip and the various other components of the clamp are manufactured from steel.

THE DRAWINGS

Further features and other objects and advantages of this invention will become clear from the detailed description made with reference to the drawings in which.

DETAILED DESCRIPTION

Figure 1:
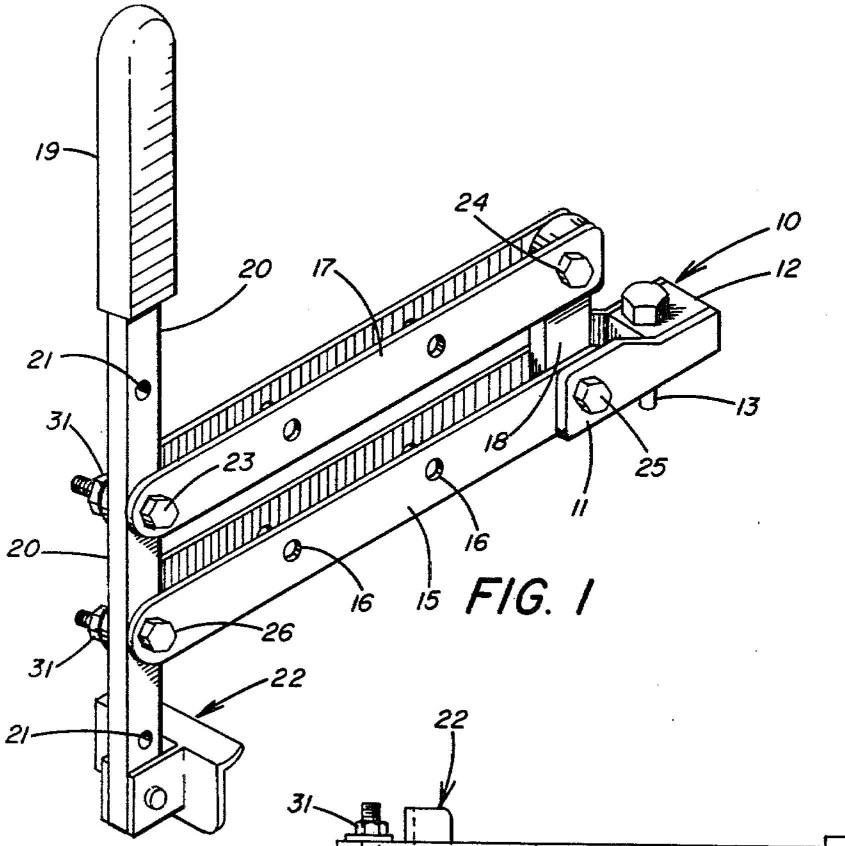
FIG. 1 is a perspective view of a clamp according to this invention.
Figure 2:
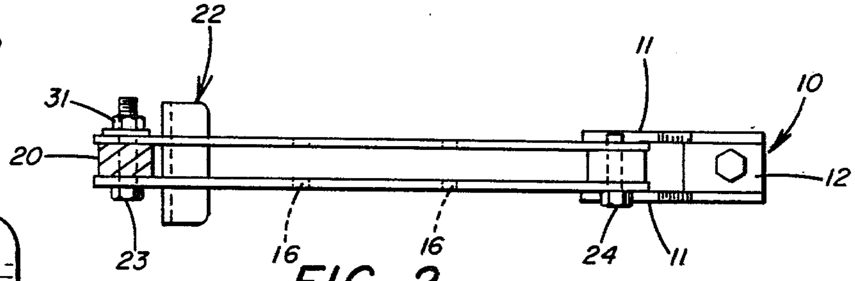
FIG. 2 is a top view of the clamp.
Figure 3:
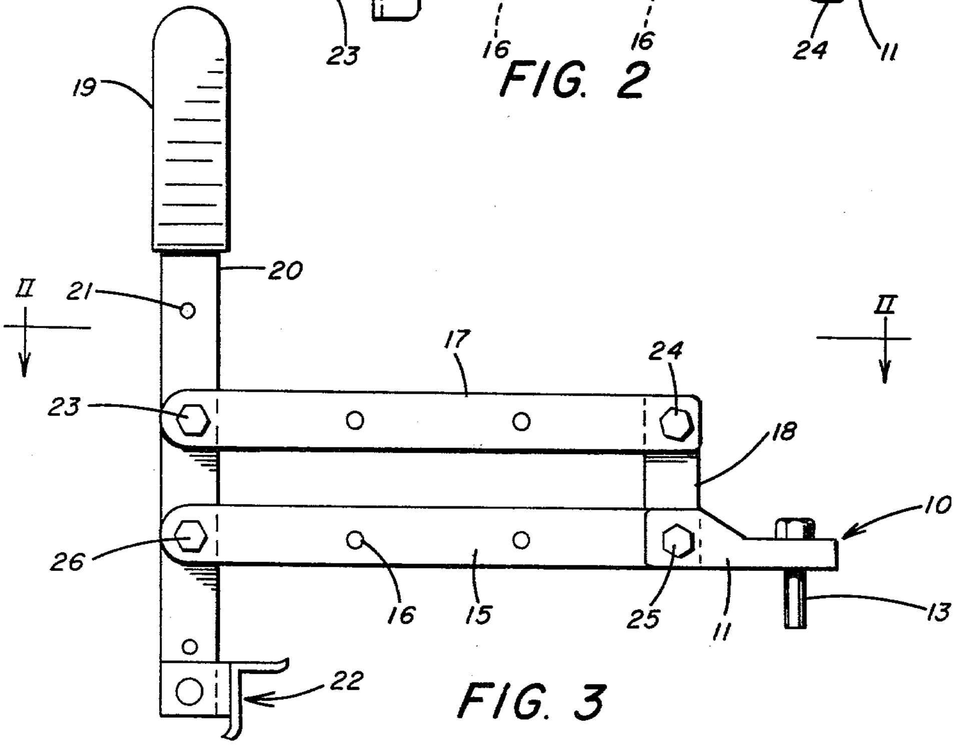
FIG. 3 is a side view of the clamp.

Referring now to FIG. 1, there is illustrated a clamp according to this invention which comprises a base 10. The base has two side flanges 11 which are parallel to each other and rise up perpendicular to the deck 12. The base 10 can be cut from a channel iron, box beams or fabricated from flat members. It could even be cast. The base has extending downward from its underside a pin or plug 13 which may be the extension of a plug inserted through a bore in the bed of the base. Preferably, the plug has no threads. Thus, the plug 13 may be inserted in a bore or bushing in the miter square itself to secure the base to the miter square in a way permitting the base to swivel relative to the miter square and the clamp to be quickly and easily removed from the miter square. Alternatively, if desired a threaded plug could be used.

The clamp comprises a first spanning arm 15 which may be comprised of two identical flat steel members having spaced bores 16 therein. The spanning arm has bores at or near to each end thereof as well as spaced therebetween. A second spanning arm 17 may comprise two elements identical to those defining the first spanning arm.

The first spanning arm 15 and a short riser arm 18 are both pivotally mounted to rotate about the same axis by a pin, shoulder bolt, rivet or the like 25. With the embodiment shown in the drawing, the two members comprising spanning arm 15 sandwich the short riser arm 18 therebetween. The bores in the side flanges 11 are positioned so that the pin 25 is parallel to the deck 12. Thus the spanning arm and riser arm rotate in a plane perpendicular to the deck 12 and turn with respect to the top of the saw table (not shown). The second spanning arm 17 is pivotally mounted to the upper end of the riser arm 18 by a pin 24 which may be the same as pin 25.

A gripper arm 20 has a plurality of bores 21 therein spaced along its length, the distance between at least two bores therein being substantially the same as the distance between the bores at each end of the riser arm 18. At one end of the gripper arm is a handle 19 and, at the other end is a shoe 22 for bearing against the upper front edge of the workpiece. The gripper arm is held to the spanning arms by removable threaded pins 23, 26 with nuts 31. Thus the four arms define a parallelogram structure in the preferred embodiment. Depending on the width of the workpiece, the gripper arm is moved closer or further from the base by removing the pins 23 and 26 and securing the gripper arm through a different set of bores in the spanning arms.

The easily removable pins 23 and 26 must be removable for adjustment of the gripper arm 20 toward and away from the base. However, the easily removable pins must not be permitted to vibrate free causing a potentially dangerous situation.

The shoe 22 is in the form of an angle and may comprise a portion of an angle iron pivotally supported from the lower end of the gripper arm. Preferably, the webs of the angle are flared, that is, they curve away from the interior of the right angle formed by them. This flare aids in the prevention of marking soft wood workpieces. Of course, the shoe may be made of strong plastic material which does not mark the workpiece. The shoe is preferably mounted for restricted angular movement. The web which rests on the top of the workpiece should be generally horizontal (i.e. parallel to the deck of the base) with freedom to move downward (away from the handle) by rotation of no more than about forty-five degrees.

In use, depending upon the width of the workpiece, the lengths of the spanning arms 15, 17 are adjusted by moving the gripper arm 20 forward or away from the base. Depending upon the thickness of the workpiece, the gripper arm 20 is moved up or down relative to the spanning arms. Thereafter, the shoe 22 is positioned upon the top leading edge of the workpiece. To do so, it may be necessary to change the angles between the spanning arms and the surfaces of the workpiece. When the shoe 22 grips the leading front edge of the workpiece, the handle 19 can be pressed in the direction along the spanning arms away from the base 10. The pressure on the handle in the said direction forces the shoe against the workpiece and holds the workpiece snuggly against the miter square. At the same time, the pressure on the handle tends to move the entire workpiece and miter square toward the work station which may be the rotating radial table saw referred to above. The pressure on the handle also places a downward pressure on the leading edge of the workpiece. The downward pressure on the workpiece prevents it from rising ever so slightly from the table, which rising would cause wood to splinter away from the saw blade. The downward pressure by shoe 22, upon pressure pressing of the handle 19 in a direction away from the base (and an operator) is believed to be enhanced by the cam action of the pair of spanning arms. With but a single spanning arm, pressing the handle away from the base can actually raise the front edge of the workpiece up off the saw table. With the double spanning arms, and especially with a parallelogram configuration, this tendency to raise the front edge of the workpiece is avoided.

Having thus described the invention with the detail and particularity required by the Patent Laws, what is desired protected by Letters Patent is set forth in the following claims.

I claim:

1. A clamp for a miter square of a table saw or the like for engaging the leading edge of a workpiece comprising, a base having a downwardly extending plug for rotatably securing the base to the miter square, said base having two upstanding flanges with bores therein for receiving a pin perpendicular to said flanges, a first spanning arm having a plurality of spaced bores along the length thereof with a base end bore near the one end of the first spanning arm, said spanning arm rotatably secured by a pin through said base bore and the bores in the base flanges, a short riser arm having openings near each end thereof, said short riser arm rotatably held to the base by the same pin that holds the first spanning arm rotatably thereto, a second spanning arm substantially identical to the first, said second spanning arm rotatably secured to the end of the short riser arm away from the base by a pin passing through bores in the ends of each, an elongate upstanding gripper arm having a handle at one end and a shoe at the other with a plurality of bores therebetween, said gripper arm rotatably secured to the first and second spanning arm by a pair of removable pins placed in a selectable pair of bores on the gripper arm and in selectable bores in each spanning arm whereby pressing the handle in a direction along the spanning arms and away from the base advances the miter square while forcing the shoe against the workpiece thus clamping the workpiece against the miter square.

2. The clamp according to claim 1 wherein the first and second spanning arms comprise a pair of identical flat members between which the short riser arm and the gripper arm are sandwiched.

3. The clamp according to claim 1 or claim 2 wherein the ends of the first spanning arm and riser arm near the base are curved and have bores sufficiently near the ends such that rotation of the arms is unrestricted.

4. The clamp according to claim 1 or claim 2 wherein the shoe comprises an angle with one web arranged for laying against the top surface of the workpiece and another web arranged for laying against the leading edge of the workpiece, said angle secured for restricted rotation near the lower end of the gripper arm.

5. The clamp according to claim 4 wherein the webs are curved away from the more or less ninety degree angle formed by them.

* * * * *